US008046288B1

(12) United States Patent  
LeRoux et al.

(10) Patent No.: US 8,046,288 B1
(45) Date of Patent: Oct. 25, 2011

(54) SYSTEM AND METHOD FOR PAYMENT DATA PROCESSING

(75) Inventors: Lambert Wayne LeRoux, Tierra Verde, FL (US); Russell James Mahy, Clearwater, FL (US); Jay Stumpf Dollard, Odessa, FL (US); Chirayu Gangadhar Harshe, Palm Harbor, FL (US); Michael Kerrick Nicholls, Odessa, FL (US); Eric Randall Bessell, Valrico, FL (US); Kirk Thomas Kotz, Tampa, FL (US); Gregory James Bricker, Valrico, FL (US); Rosemary R. Thomas, Plano, FL (US); Mark A. Lawler, Lewisville, TX (US); Satish Menon, Plano, TX (US); Michael P. Duffy, Farmers Branch, TX (US); Laura C. Rogers, Plano, TX (US); George J. White, Hampstead, NH (US)

(73) Assignee: Paymentech, LLC, Dallas, TX (US)

( * ) Notice: Subject to any disclaimer, the term of this patent is extended or adjusted under 35 U.S.C. 154(b) by 3499 days.

(21) Appl. No.: 09/592,776

(22) Filed: Jun. 13, 2000

(51) Int. Cl.
*G06Q 40/00* (2006.01)
(52) U.S. Cl. ......................... 705/37; 35/36; 35/38; 35/39
(58) Field of Classification Search .............. 705/35–39, 705/40
See application file for complete search history.

(56) References Cited

U.S. PATENT DOCUMENTS

| | | | | |
|---|---|---|---|---|
| 4,799,156 A * | 1/1989 | Shavit et al. | .................. | 364/401 |
| 5,222,018 A | 6/1993 | Sharpe et al. | .................. | 364/406 |
| 5,450,317 A | 9/1995 | Lu et al. | .................. | 364/406 |
| 5,490,060 A | 2/1996 | Malec et al. | .................. | 364/401 |
| 5,757,917 A | 5/1998 | Rose et al. | .................. | 380/25 |
| 5,765,143 A | 6/1998 | Sheldon et al. | .................. | 705/28 |
| 5,774,883 A | 6/1998 | Andersen et al. | .................. | 205/38 |
| 5,812,997 A | 9/1998 | Morimoto et al. | .................. | 707/2 |
| 5,832,456 A | 11/1998 | Fox et al. | .................. | 705/10 |
| 5,854,746 A | 12/1998 | Yamamoto et al. | ...... | 364/468.13 |
| 5,909,492 A | 6/1999 | Payne et al. | .................. | 380/24 |
| 6,327,578 B1 * | 12/2001 | Linehan | .................. | 705/65 |
| 6,332,133 B1 * | 12/2001 | Takayama | .................. | 705/39 |
| 6,334,116 B1 * | 12/2001 | Ganesan et al. | .................. | 705/34 |
| 6,360,211 B1 * | 3/2002 | Anderson et al. | .................. | 705/40 |
| 6,411,940 B1 * | 6/2002 | Egendorf | .................. | 705/40 |
| 7,571,142 B1 * | 8/2009 | Flitcroft et al. | .................. | 705/44 |
| 2002/0059114 A1 * | 5/2002 | Cockrill et al. | .................. | 705/27 |

OTHER PUBLICATIONS

Scala Named 'Best E-Commerce Enabling Application' In Gartner E-Commerce Competition, PR Newswire. New York: Apr. 29, 1999. p. 1.*

* cited by examiner

*Primary Examiner* — Alexander Kalinowski
*Assistant Examiner* — Clement Graham
(74) *Attorney, Agent, or Firm* — Jackson Walker L.L.P.; Christopher J. Rourk

(57) ABSTRACT

A system for processing transaction data and payment data is provided. The system includes a front-end system that receives transaction data from one or more merchants, such as an employee identifier. A back-end system receives payment data from one or more payment systems, such as fraud data. A reporting system that is connected to the front-end system and the back-end system correlates the transaction data the payment data, such as to show employee identifier data and fraud data in a single record.

15 Claims, 7 Drawing Sheets

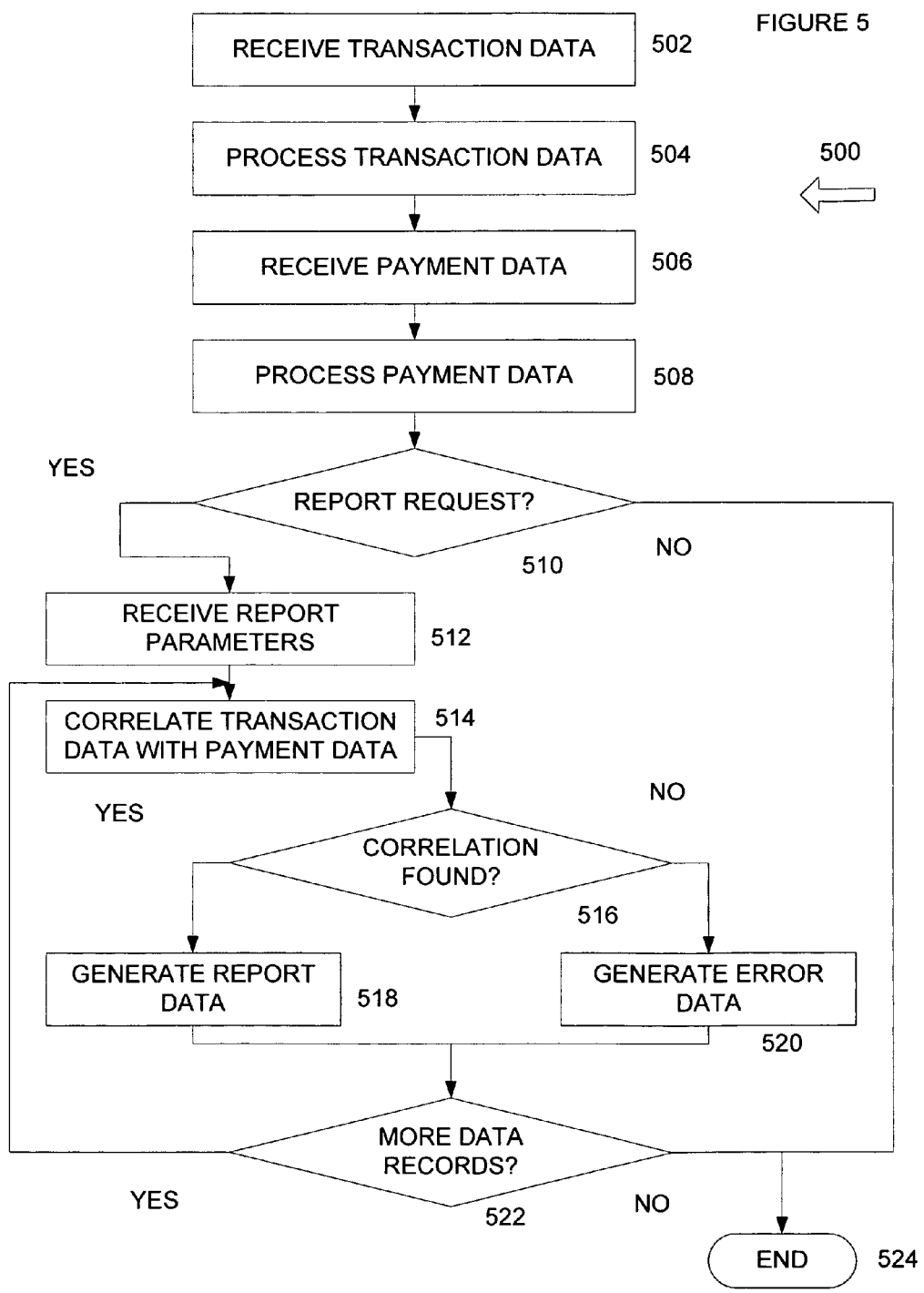

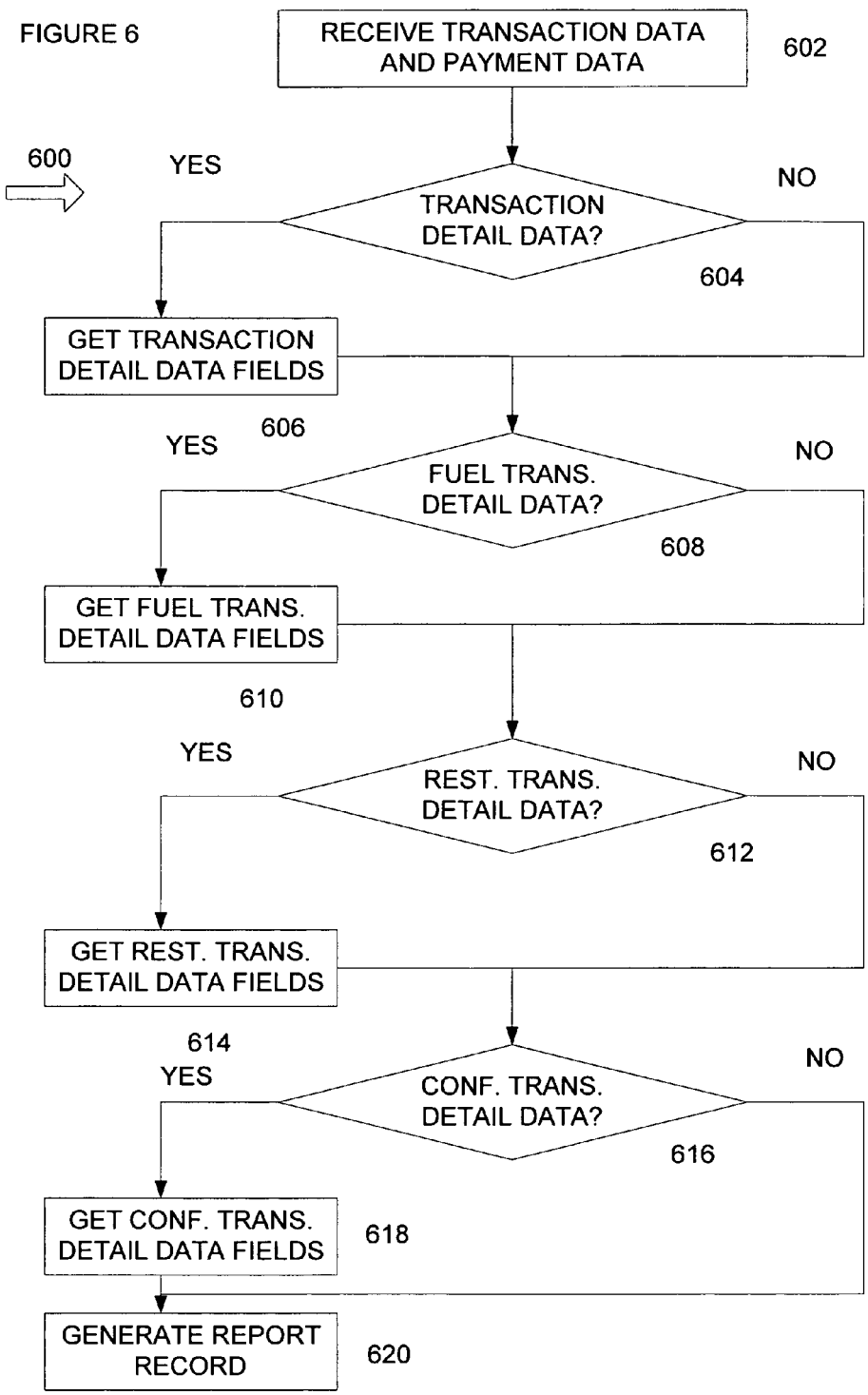

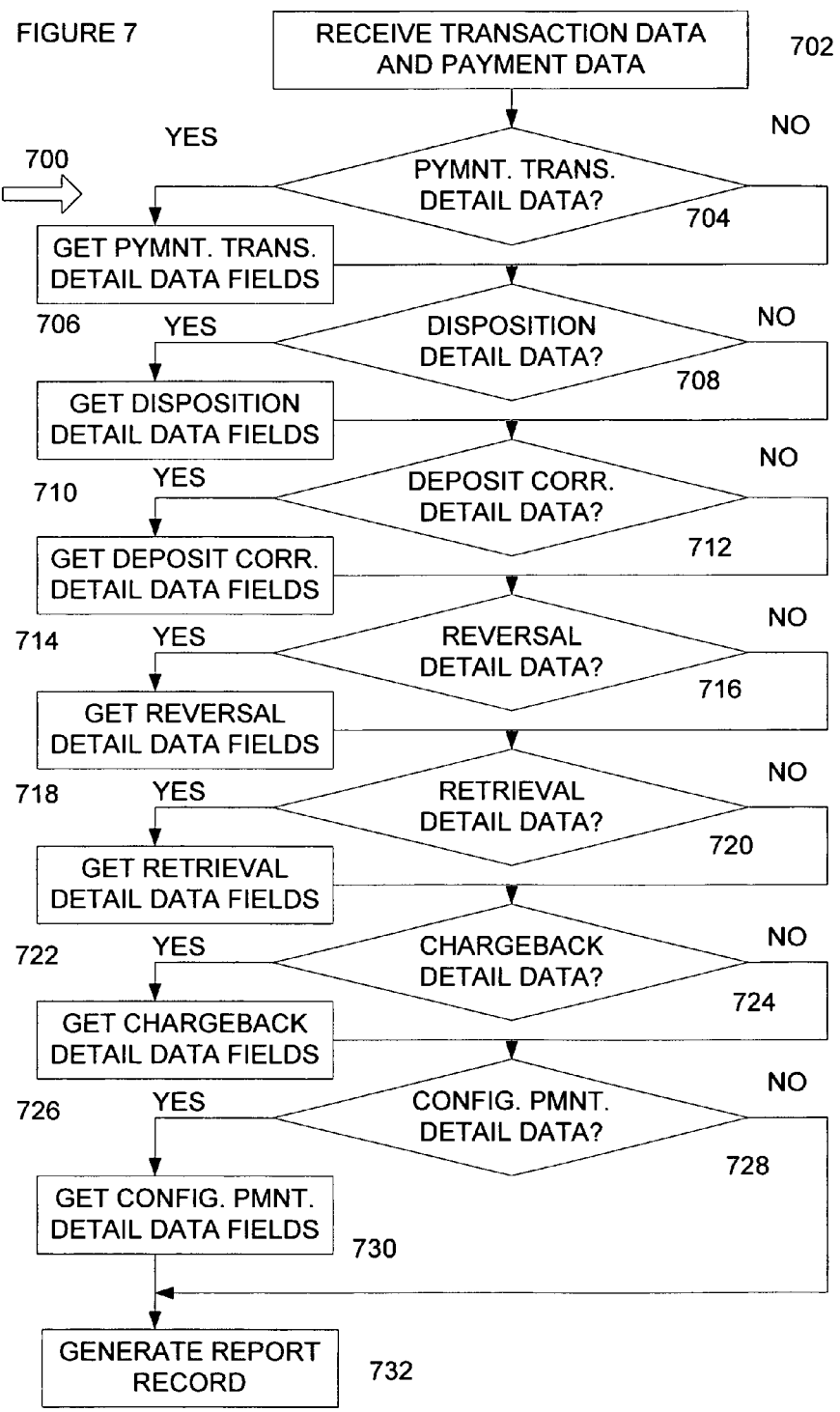

SYSTEM AND METHOD FOR PAYMENT DATA PROCESSING

FIELD OF THE INVENTION

The present invention pertains to the field of payment data processing. More specifically, the invention relates to a system and method for processing payment data that allows transaction data and payment data to be combined in a single report record.

BACKGROUND

The processing of transaction data separate from payment data is known in the art. Transaction data is received from a merchant by a transaction consolidator on records or in an electronic format, and is then processed to generate transaction data for credit card issuers, issuing banks, and other insitutions. The credit card issuers, issuing banks, and other institutions then process the transaction data internally to generate payment data, so as to authorize any payment requests contained in the transaction data. If problems are detected by the credit card issuers, issuing banks, or other institutions, then the payment data can be transmitted to the transaction consolidator. The transaction consolidator must then interface with the merchant to resolve the problem. If no problems are detected, then the merchants receive payment.

The processing of transaction data and payment data has already been automated, which has resulted in many unforeseen advantages. Nevertheless, problems are still encountered with the processing of transaction data and payment data that have not been solved by the automation of transaction data processing and payment data processing. Merchant equipment or personnel can cause the incorrect entry of data in a manner that is not detected at the time of sale. Fraud can also be committed. When such problems are detected by the user, the user may contact the issuing bank, credit card company, or other payment system to dispute the charge, ask for additional information, or take other suitable actions. The dispute is then relayed to the merchant, which must be notified in a timely manner of the problem and which must readily identify all of the relevant data to resolve the problem.

Because of the large quantity of data generated by the processing of transaction data and payment data, such problems have been resolved in the past by manual searching and processing of the transaction data and the payment data. This has been required in part because the transaction data and payment data has not been available in a single record. Data storage requirements for such "single record" data have exceeded readily available data storage requirements in the past. In addition, transaction data and payment data are generated at different times and by different entitites, and the payment data may be updated repeatedly during payment processing. As a result, "single record" processing of transaction data and payment data has not been available for numerous reasons.

SUMMARY OF THE INVENTION

In accordance with the present invention, a system and method for processing payment data are provided that overcome known problems with the processing of payment data.

In particular, a system and method for processing payment data are provided that allows the transaction data generated by merchants to be combined with the payment data generated by payment systems so as to allow problems with transaction or payment data to be readily determined.

In accordance with an exemplary embodiment of the present invention, a system for processing transaction data and payment data is provided. The system includes a front-end system that receives transaction data from one or more merchants, such as an employee identifier. A back-end system receives payment data from one or more payment systems, such as fraud data. A reporting system that is connected to the front-end system and the back-end system correlates the transaction data the payment data, such as to show employee identifier data and fraud data in a single record.

The present invention provides numerous important technical advantages. One important technical advantage of the present invention is a system for processing transaction data and payment data that allows user-selected data fields from the transaction data to be combined with user-selected fields from the payment data into a single data record. The present invention thus facilitates operator review of transaction data and payment data to allow the operator to readily identify problems and possible causes for such problems.

Those skilled in the art will further appreciate the advantages and superior features of the invention together with other important aspects thereof on reading the detailed description that follows in conjunction with the drawings.

BRIEF DESCRIPTION OF THE DRAWINGS

FIG. 5 is a flow chart of a method for processing transaction data and payment data in accordance with an exemplary embodiment of the present invention;

FIG. 6 is a flowchart of a method for generating report data in accordance with an exemplary embodiment of the present invention; and FIG. 7 is a flowchart of a method for processing payment data in according with an exemplary embodiment of the present invention.

DETAILED DESCRIPTION OF PREFERRED EMBODIMENTS

Figure 1:
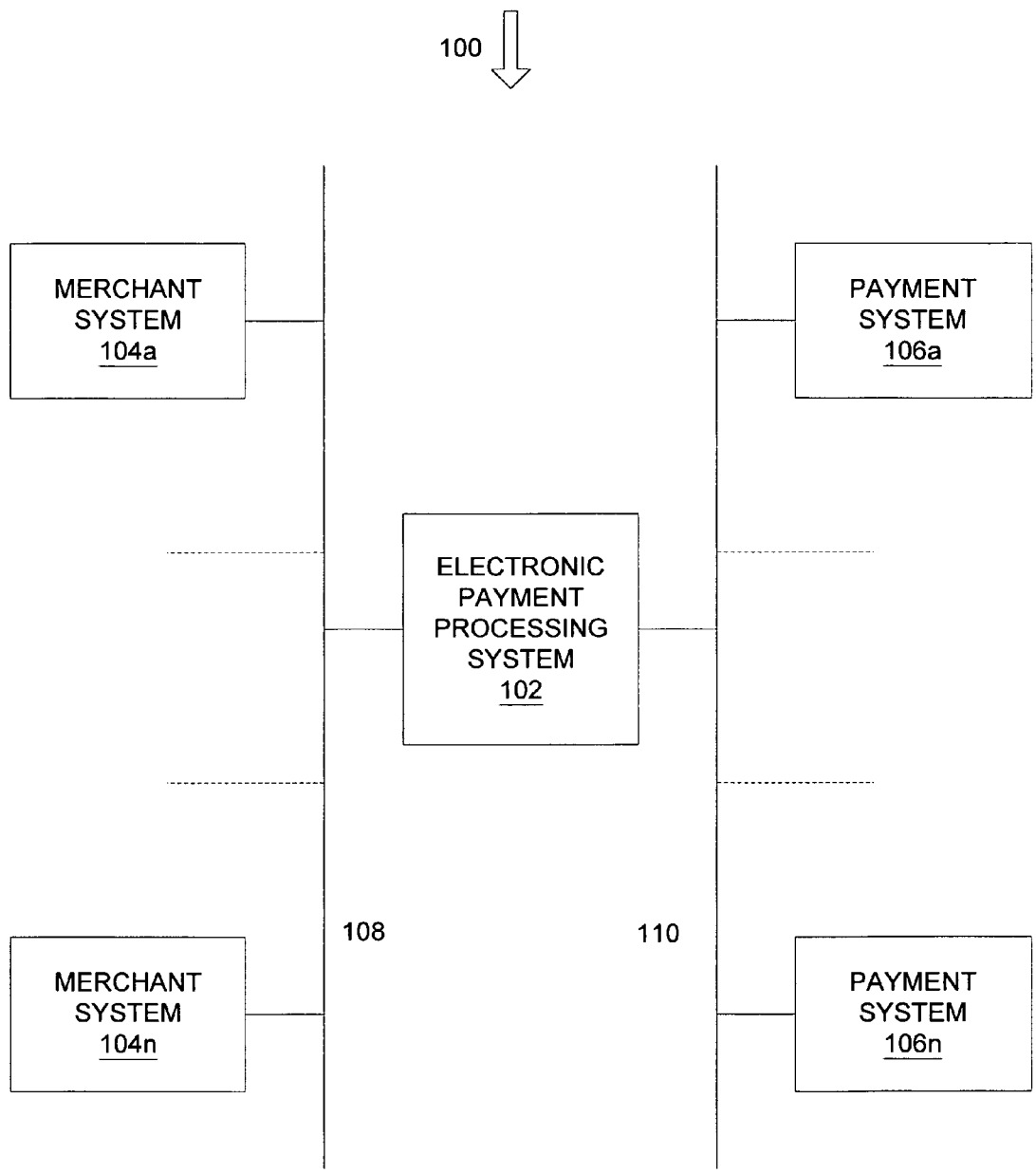
FIG. 1 is a diagram of a system for processing payment data in accordance with an exemplary embodiment of the present invention.

In the description which follows, like parts are marked throughout the specification and drawing with the same reference numerals, respectively. The drawing figures may not be to scale and certain components can be shown in generalized or schematic form and identified by commercial designations in the interest of clarity and conciseness.

FIG. 1 is a diagram of a system 100 for processing payment data in accordance with an exemplary embodiment of the present invention. System 100 allows transaction data from "front end" parties, such as merchants, to be combined with payment data from "back end" parties, such as credit card companies, issuing banks and other payment systems, so as to facilitate the processing of payment data.

System 100 includes payment processing system 102. Payment processing system 102 can be implemented in hardware, software, or a suitable combination of hardware and software, and can be one or more software systems operating on one or more general purpose server computing platforms. As used herein, a software system can include one or more lines of computer code, one or more objects, one or more agents, one or more subroutines, one or more separate software applications, two or more lines of code operating in two or more different software applications, and other suitable code configurations, and can operate on one or more processing platforms. For example, a software system can include one or more lines of code from a specific purpose software program that interacts with one or more lines of code in a processor operating system computer program to receive predetermined data, perform predetermined operations on the data, and to output data generated therefrom.

Payment processing system 102 is coupled to merchant systems 104a through 104n through communications medium 108. As used herein, the term "couple" and its cognate terms such as "coupled" and "coupling" can include a physical connection (such as through a copper conductor), a virtual connection (such as through randomly assigned memory locations of a data memory device), a logical connection (such as through logical gates of a semiconducting device), a combination of such connections, or other suitable connections. For example, systems and components may be coupled to other systems and components through intervening systems and components. In one exemplary embodiment, a software system is coupled to another software system through an operating system of the computing platform on which the software systems operate.

Merchant systems 104a through 104n may be implemented in hardware, software, or a suitable combination of hardware and software, and may be one or more software systems operating on a point of sale purchase terminal. Merchant systems 104a through 104n are used by merchants to submit transaction data for processing by payment processing system 102, to determine the status of such transactions, and to analyze transaction data and payment data to identify and resolve problems. For example, merchant systems 104a through 104n can be point of sale terminals and associated software systems operating on the point of sale terminals that receive credit card data and that transmit the credit card data to payment processing system 102 in addition to other suitable data. In this exemplary embodiment, each terminal has a terminal identification number, which is transmitted to payment processing system 102 with the credit card data. Likewise, the time of sale, date of sale, amount of sale, merchandise being sold, cashier handling the sale, and other suitable data are transferred from merchant systems 104a through 104n to payment processing system 102.

Communications medium 108 is a suitable communications medium for connecting merchant systems 104a through 104n to payment processing system 102. For example, communications medium 108 may be the Internet, the public switched telephone network, microwave communications media, satellite communications media, fiberoptic communications media, a local area network, a wide area network, a combination of two or more of these communications media, or other suitable communications media.

Payment processing system 102 is coupled to payment systems 106a through 106n over communications medium 110. Payment systems 106a through 106n receive the transaction data from payment processing system 102 and verify payment according to the terms of the transaction data and contractual agreements with the users of payment systems 106a through 106n. For example, payment systems 106a through 106n may be credit card organizations, issuing banks, or other suitable organizations that control the payment of funds from individual users. Payment systems 106a through 106n receive the transaction data, which includes account identification such as credit card number, amount, cardholder name, transaction type, merchant identification data, transaction date, and other suitable data. Payment systems 106a through 106n then perform additional processing of the transaction data in order to validate and authorize the transfer of funds to the merchant from the payment systems 106a to 106n.

In this exemplary embodiment, payment systems 106a through 106n also allow the user to dispute the transaction in the event the transaction was not properly authorized. Likewise, processing to determine mistakes in the amount of the transaction, fraud indications, and other processing-related errors may be performed by payment systems 106a through 106n.

Likewise, merchant systems 104a through 104n may also be required to submit transaction documentation and related data within a predetermined period of time in order to resolve any problems with such transaction and payment processing. If the affected merchant systems do not submit such transaction documentation and related data is not submitted according to predetermined criteria, then penalties may be assessed against them according to contractual provisions between the merchants and the payment systems. Likewise, if a user disputes a charge, then the dispute will be transmitted back from the affected payment system 106a through 106n, to payment processing system 102, and then to the affected merchant system 104a through 104n. The affected merchant system 104a through 104n must then respond to the disputed transaction in a timely manner or waive the right to respond.

Payment processing system 102 combines the transaction data received from merchant systems 104a through 104n with the payment data received from payment systems 106a through 106n, so as to allow the transaction and payment data to be evaluated by a user to identify problems with the transaction data, the payment data, or both the transaction data and the payment data. For example, a user of merchant systems 104a through 104n can verify whether any or all submitted transactions have been received for processing by payment systems 106a through 106n, so as to identify any transactions for which there is not corresponding payment data or for which there are problems with the transaction data. In this manner, payment processing system 102 allows a merchant to check a single transaction or every transaction that has been submitted for payment, so as to verify that the transaction is being processed and to identify transactions requiring further attention.

Likewise, payment processing system 102 allows a merchant to request information on transactions for which the charge has been reversed. For example, if a user received a charge that they believe is improper, the user may notify payment system 106a through 106n and dispute the charge. The charge may then be temporarily or permanently reversed depending upon the circumstances of the disputed charge. In one exemplary embodiment, if a user notifies the operator of a payment system 106a through 106n that a credit card has been stolen, then all charges that were billed to the user's account after the time that the card was stolen may be reversed. Likewise, deposit correction information may be requested such as to identify problems with the merchant's point of sale terminal, the merchant's card reader, the card number that was entered, the authorization code that was entered, the card type that was used, or other correction data.

Another scenario in which payment processing system 102 may be used advantageously to combine transaction data with payment data is in the event of a retrieval request. For example, if a user disputes the amount of a charge, or other information, the user may request that the payment authorization record be retrieved from the affected merchant system 104a through 104n, such as to verify the amount that was authorized, the user's signature, or other data. Such payment authorization record may be located on a physical document, or may be stored in data records that are stored at the affected merchant system 104a through 104n. Operators of merchant systems 104a through 104n can thus use payment processing system 102 to obtain a status report containing details of all pending retrieval requests. Likewise, in the event a retrieval request is not responded to, or if the response indicates that the charge was improper, chargeback data may be generated that reverses the disputed charge to the merchant. Payment processing system 102 allows reports to be generated combining transaction data and payment data to identify these and other conditions.

In addition, some data generated by merchant systems 104a through 104n is not transmitted to payment systems 106a through 106n. For example, if the merchant system is reporting a fuel transaction, a restaurant transaction, a mail order transaction, an e-commerce transaction, a hotel transaction, or other suitable transactions, the merchant system may transmit data to payment processing system 102 that is not forwarded to payment system 106a through 106n.

In this event, the merchant may require report data that combines this non-transmitted data with the response data from the payment processing systems 106a through 106n in order to analyze problems with the payment process. In this exemplary embodiment, the merchant may be able to identify that mistakes in data processing are being caused by certain personnel, at certain times of the day, for certain types of merchandise, or in other circumstances. The merchant may then institute protective measures to prevent mistakes from being caused. Thus, payment processing system 102 facilitates analysis of transaction data and payment data in a manner not previously available by performing on-going updates of selected transaction data and selected payment data, which allows current data to be stored for an extending period of time at a single location.

Figure 2:
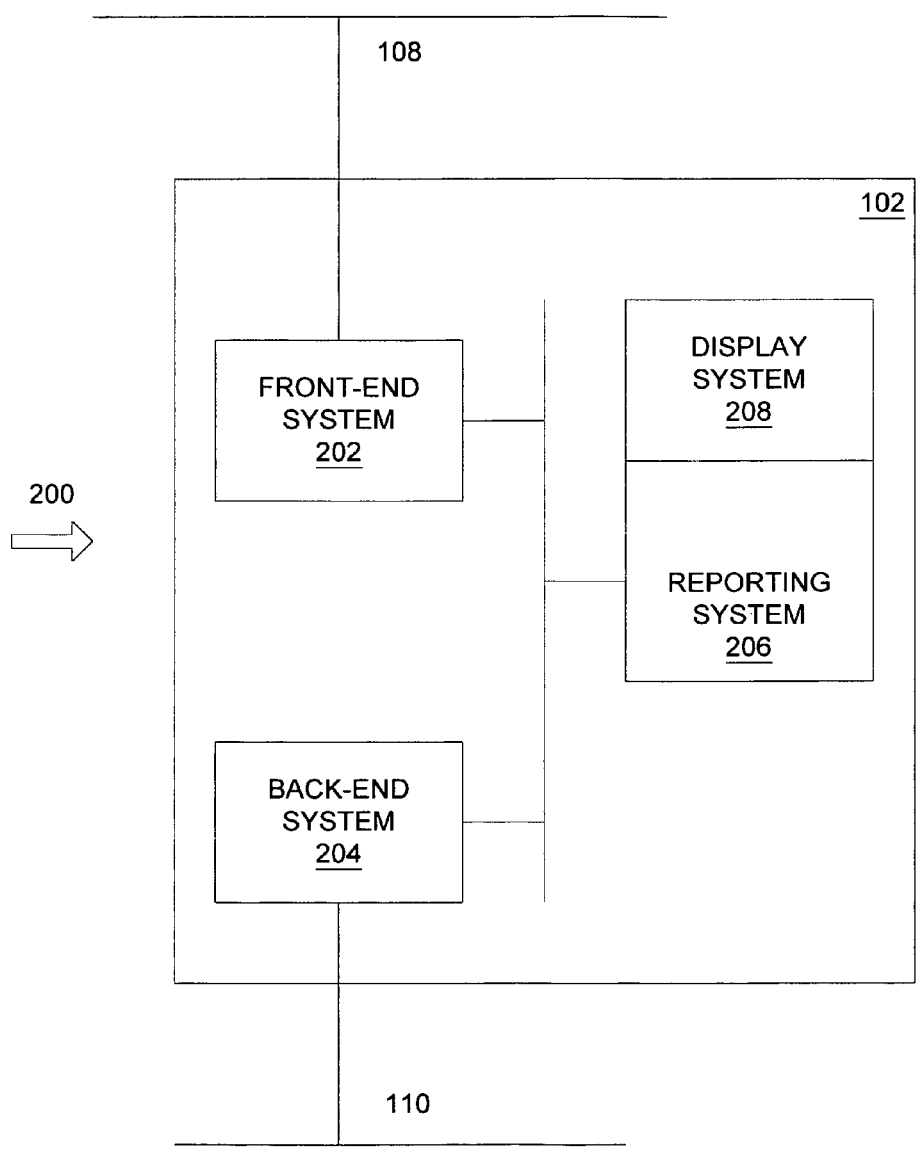
FIG. 2 is a diagram of a system for reporting transaction data and payment data in accordance with an exemplary embodiment of the present invention.

FIG. 2 is a diagram of a system 200 for reporting transaction data and payment data in accordance with an exemplary embodiment of the present invention. System 200 includes payment processing system 102 and additional system functionality.

System 200 includes front end system 202, back end system 204, and reporting system 206, each of which can be implemented in hardware, software, or a suitable combination of hardware and software, and which can be one or more software systems operating on a general purpose server platform. Front end system 202 is coupled to communications medium 108 and can receive the following exemplary data fields in the form of one or more transaction data records from a plurality of merchant systems:

| | |
|---|---|
| Transaction amount data | In predetermined currency, or with currency identifier—e.g. U.S. dollars |
| Merchant identification data | User or industry defined data field |
| Personnel identification data | User or industry defined data field |
| Purchaser identification data | User or industry defined data field |
| Terminal data | E.g., point of sale terminal identifier |
| Transaction type data | User or industry defined data field |

-continued

| | |
|---|---|
| Purchased material data | User or industry defined data field |
| Transaction date | User or industry defined date field—e.g. 010199 |
| Transaction time | User or industry defined data field |
| Other suitable data | User or industry defined data field |

Front end system 202 compiles transaction data records containing data fields that are associated with each transaction, and processes the data fields in a predetermined manner so as to facilitate the authorization of payment for transactions.

Back end system 204 is coupled to plurality of payment systems through communications medium 110. Back end system receives payment data from the plurality of payment systems, including the following exemplary data records, each of which may include one or more data fields:

| | |
|---|---|
| Payment authorization data | Authorization received from payment system, such as bank; date payment request received, date user authorization received, etc. |
| Payment dispute data | E.g., if user disputes charge authorization, amount, quality of services, etc. |
| Requests for additional information | E.g., if user requests data on who merchant is, what was purchased, who authorized, etc. |
| Retrieval requests | E.g., if transaction record bearing user's signature is required. |
| Deposit correction notice data | E.g., if number was incorrectly entered at point of sale terminal. |
| Chargeback data | E.g. if amount of charge transaction is being refused, such that merchant will not be compensated. |
| Fraud indication data | E.g., if card has been reported stolen. |
| Other suitable data | User or industry defined data fields. |

Back end system 204 compiles payment data records containing data fields that are associated with each payment, and processes the data fields in a predetermined manner so as to facilitate the payment of merchants for transactions.

Front system 202 and back end system 204 are coupled to reporting system 206. Reporting system 206 is operable to select data fields from data records of front end system 202 and back end system 204, and to combine the data fields to form predetermined data records, so as to allow a user to perform data processing on the combined data fields. For example, reporting system 206 may receive a data record containing one or more data fields from front end system 202, and may receive a data record containing one or more data fields from back end system 204. Reporting system 206 may then determine whether the two data records are correlated to the same transaction.

In one exemplary embodiment, each transaction data record can contain one or more data fields that are identical to one or more data fields of a corresponding payment data record. Reporting system 206 can locate related transaction data records and payment data records and generate error data in the event one or more data fields of related transaction data records and payment records do not match. Reporting system 206 can also generate error data if transaction records from front end system 202 do not have a corresponding payment record from back end system 204 and if payment records from back end system 204 do not have a corresponding transaction record from front end system 202.

Reporting system 206 also receives user-selected report criteria, and can process files of data records from front end system 202 and back end system 204 to create reports in response to the user-entered report criteria. For example, a user may request to see all transaction data records for which a retrieval request has been received. In addition, the user may request that a data field from a transaction data record of the front end system 202 that corresponds to the operator of the point of sale terminal for which such transaction retrieval request has been received be identified and reported. Reporting system 206 can match the data fields from the transaction data record of the front end system 202 to the data fields from the payment data record of the back end system 204, so as to identify such retrieval request records, and to extract the point of sale terminal user data. Reporting system 206 then generates a report that contains the requested records in a suitable format.

In operation, system 200 allows a user to generate reports that contain data fields from transaction data records from a front end system 202 with data fields from a payment data record from a back end system 204 so as to facilitate the processing of payment data. Such payment data may include a large number of transaction data records and payment data records that must be processed before payment can be authorized for each transaction. Nevertheless, discrepancies in data may require additional operator attention, such as where the data falls outside of acceptable transaction parameters. The reason for such unacceptable data may be due to fraud, system misoperation, operator misoperation, equipment misoperation, or other sources, and operator review of the unacceptable data and other related data may be required before the exact reason can be determined. System 200 allows an operator to quickly and effectively focus on potential sources of a problem, so as to identify such problems in a manner that was heretofore unavailable. System 200 also allows predetermined data fields of transaction data records and payment data records a to be assembled in a single data record that may then be processed to identify transaction and payment discrepancies.

Figure 3:
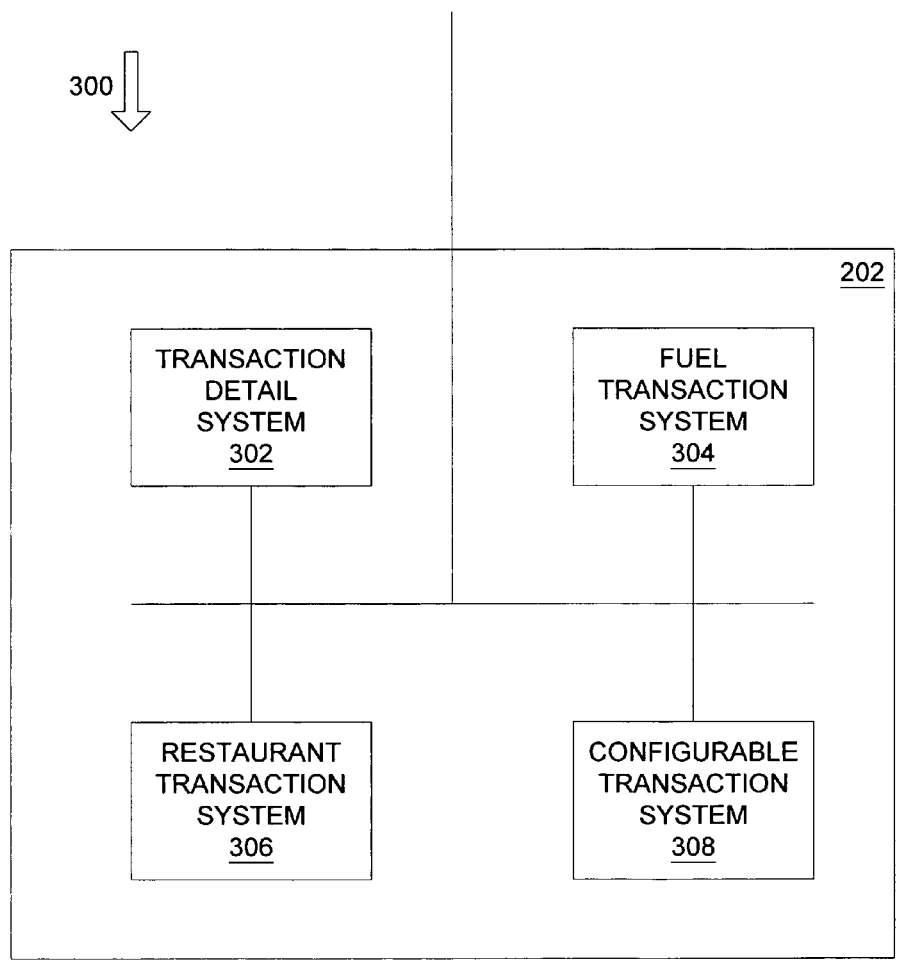
FIG. 3 is a diagram of a front end data processing system in accordance with an exemplary embodiment of the present invention.

FIG. 3 is a diagram of a front end data processing system 300 in accordance with an exemplary embodiment of the present invention. System 300 includes front end system 202 and additional functionality.

System 300 includes transaction detail system 302, fuel transaction system 304, restaurant transaction system 306, and configurable transaction system 308, each of which may be implemented in hardware, software, or a suitable combination of hardware and software, and which can be one or more software systems operating on a general purpose server platform. Transaction detail system 302 can receive transaction data records for auto rental transaction, electronic commerce transactions, mail order transactions, and other suitable transactions, and can identify predetermined data fields in the transaction data records.

For example, transaction detail system 302 may receive transaction data records in a predetermined format that indicates that an auto rental transaction is being reported for the transaction. The auto rental transaction data can include the following exemplary data fields:

| | |
|---|---|
| Rental pickup date | Date of pickup—e.g. 010199 |
| Rental return data | Date of return—e.g. 010299 |
| Rental agreement data | User or industry defined data field |
| Rental agreement value | In predetermined currency, or with currency identifier—e.g. U.S. dollars |
| Extra charge data | In predetermined currency, or with currency identifier—e.g. U.S. dollars |
| Other suitable data | User or industry defined data fields |

Electronic commerce data can include the following exemplary data fields:

| | |
|---|---|
| Order number data | User or industry defined data fields |
| Secure electronic commerce transaction data | User or industry defined data fields |
| Cardholder certificate data | User or industry defined data fields |
| Non-authenticated transaction data | User or industry defined data fields |
| Merchant certificate data | User or industry defined data fields |
| Channel encrypted transaction data | Indicates whether channel encryption used to transmit transaction data |
| Non-secure transaction status data | User or industry defined data fields |
| Other suitable electronic commerce transaction data | User or industry defined data fields |

Mail order data may include the following exemplary data fields:

| | |
|---|---|
| Single purchase transaction data | Indication if single purchase customer |
| Recurring billing transaction data | Indication if recurring payment plan, etc. |
| Order number data | User or industry defined data fields |
| Other suitable data | User or industry defined data fields |

Restaurant transaction system 306 can receive and process transaction data records to identify data fields pertaining to restaurant transactions. For example, restaurant transaction system 306 can extract the following exemplary data fields:

| | |
|---|---|
| Tip data | In predetermined currency, or with currency identifier—e.g. U.S. dollars |
| Employee number | User or industry defined data fields |
| Server number | User or industry defined data fields |
| Food transaction identifier | User or industry defined data fields |
| Beverage transaction identifier | User or industry defined data fields |
| Other suitable data | User or industry defined data fields |

Fuel transaction system 304 can receive and process transaction data records to identify data fields pertaining to fuel transactions. For example, fuel transaction system 304 can extract the following exemplary data fields:

| | |
|---|---|
| Vehicle identification data | E.g. tag number, user-defined number. |
| Odometer data | User or industry defined data fields |
| Driver data | E.g. driver name, user-defined number |
| Product code data | User or industry defined data fields |
| Other suitable data | User or industry defined data fields |

Configurable transaction system 308 allows a user to identify data fields in the transaction data record that can be received and processed by system 300. For example, configurable transaction system 308 may allow a user to set up hotel transaction fields, telephone transaction fields, or other suitable transaction fields, so as to allow transaction data records to be processed so as to extract these user-defined data fields.

In operation, system 300 allows transaction data to be processed in a manner that facilitates subsequent user analysis of the transaction data records and transaction data fields to determine fraud indications, data input problems, and for other suitable troubleshooting purposes. System 300 allows data to be associated with a transaction data record that is not subsequently transferred to a payment system, and also facilitates the combination of such transaction-specific data with payment data record data. In this manner, system 300 facilitates troubleshooting and control in processing of transaction data and payment data.

Figure 4:
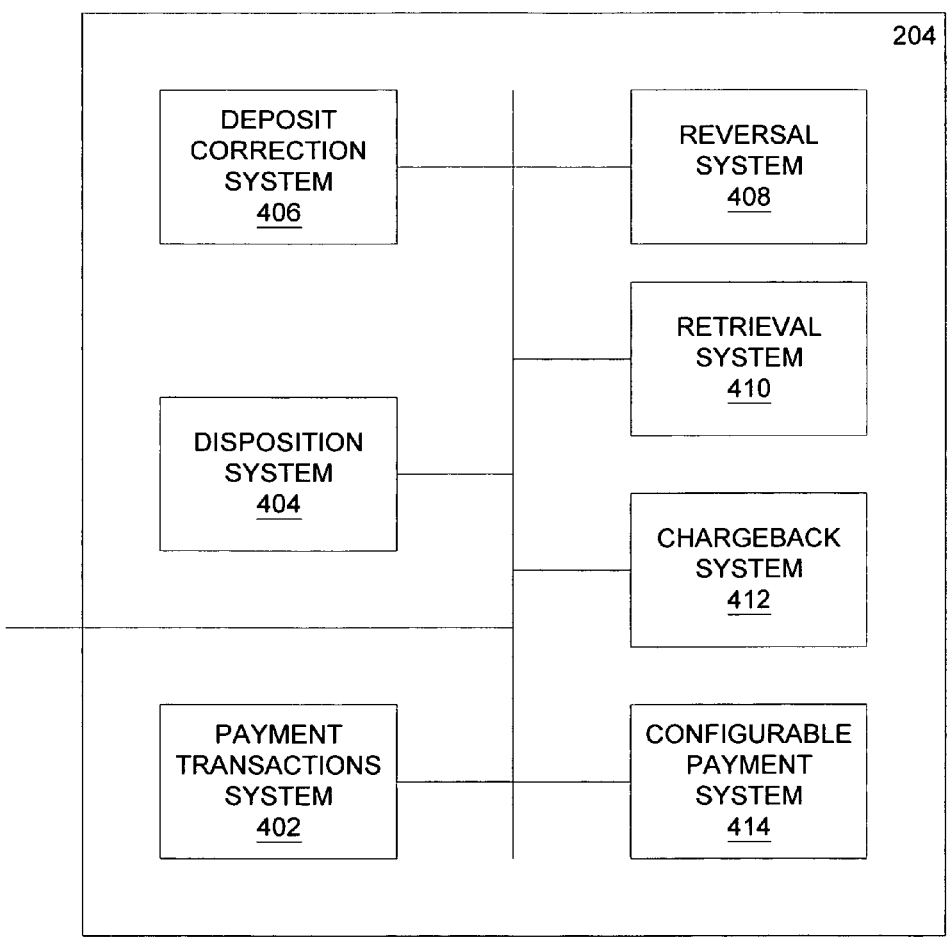
FIG. 4 is a diagram of a system for processing payment data in accordance with an exemplary embodiment of the present invention.

FIG. 4 is a diagram of a system 400 for processing payment data in accordance with an exemplary embodiment of the present invention. System 400 includes back end system 204 and additional system functionality.

System 400 includes payment transaction system 402, disposition system 404, deposit correction system 406, reversal system 408, and configurable payment system 410, each of which may be implemented in hardware, software, or a suitable combination of hardware and software, and which can be one or more software systems operating on a general purpose server platform.

Payment transaction system 402 can receive and process payment transaction data from payment systems that includes transaction data fields extracted from the transaction data record received from merchant systems, plus additional payment transaction data from payment systems. For example, payment transaction system 402 can receive and process payment transaction data records to extract the following exemplary data fields:

| | |
|---|---|
| Cardholder number | User or industry defined data fields |
| Amount of transaction | In predetermined currency, or with currency identifier—e.g. U.S. dollars |
| Transaction type | E.g. purchase, service, telecommunications, etc. |
| Merchant number | User or industry defined data fields |
| Transaction date | User or industry defined date field—e.g. 010199 |
| Transaction identification number | User or industry defined data fields |
| Batch identification number | User or industry defined data fields |
| Outlet identification number | User or industry defined data fields |
| Downgrade reason | User or industry defined data fields |
| Downgrade data | User or industry defined data fields |
| Card type | User or industry defined data fields |
| Charge type | User or industry defined data fields |
| Acquirer reference number | User or industry defined data fields |
| Merchant outlet number | User or industry defined data fields |
| Service level | User or industry defined data fields |
| Terminal identification | Point of sale terminal identifier |
| Magnetic key | Contents of card magnetic key data field |
| Deposit date | User or industry defined date field—e.g. 010199 |
| Loading date | User or industry defined data field—e.g. 010199 |
| Transaction code | User or industry defined data fields |
| Authorization code | User or industry defined data fields |
| Reject code | User or industry defined data fields |
| Card-specific data | User or industry defined data fields |
| Validation code | E.g. as received from payment consolidator |
| Other suitable data | User or industry defined data fields |

Each of these data fields may include data that has been entered by the payment system, and not the merchant system.

Disposition system 404 receives disposition data from a payment system and processes the disposition data for subsequent use. For example, disposition system may include one or more of the fields used by payment transaction system 402 to match payment data records with transaction data records, plus additional fields relating to the disposition of a payment request. For example, the following data fields may be included in the disposition data record:

| | |
|---|---|
| Iteration number | User or industry defined data fields |
| Sequence number | User or industry defined data fields |
| Resolution type | User or industry defined data fields |
| Disposition date | User or industry defined date field—e.g. 010199 |
| Merchant outlet number | User or industry defined data fields |
| Chargeback amount | In predetermined currency, or with currency identifier—e.g. U.S. dollars |
| Chargeback date | User or industry defined date field—e.g. 101099 |
| Chargeback reason identification | User or industry defined data fields |
| Acquirer reference number | User or industry defined data fields |
| Original reference number | User or industry defined data fields |
| Outlet identification card brand | User or industry defined data fields |
| Loading date | User or industry defined date field—e.g. 010199 |
| Other suitable data | User or industry defined data fields |

Deposit correction system 406 can extract and process data fields that are used to correlate the payment data record with the transaction data record and additional deposit correction data fields that are used to identify why a deposit correction is being received. For example, data received from the merchant in a transaction data record may need to be revised if it was incorrectly entered or received. The following exemplary data fields can be included in the deposit correction notice to correct potentially incorrect data that may have been received in a transaction data record:

| | |
|---|---|
| Processing date | User or industry defined date field—e.g. 010199 |
| Batch identification | User or industry defined data fields |
| Outlet identification | User or industry defined data fields |
| Deposit correction notice | User or industry defined data fields |
| Exception code number | User or industry defined data fields |
| Merchant outlet number | User or industry defined data fields |
| Transaction identification number | User or industry defined data fields |
| Loaded date | User or industry defined date field—e.g. 010199 |
| Control identification number | User or industry defined data fields |
| Other suitable data | User or industry defined data fields |

Reversal system 408 can extract and process data fields that are used to correlate a reversal record with a merchant transaction record, and additional data fields that pertain to the reversal. The following exemplary data fields may also be extracted and processed from the payment data record:

| | |
|---|---|
| Case number | User or industry defined data fields |
| Iteration number | User or industry defined data fields |
| Sequence number | User or industry defined data fields |
| Reversal date | User or industry defined date field—e.g. 010199 |
| Chargeback amount field | In predetermined currency, or with currency identifier—e.g. U.S. dollars |
| Chargeback date field | User or industry defined date field—e.g. 010199 |
| Chargeback reason identification | User or industry defined data fields |

-continued

| | |
|---|---|
| Acquirer reference number | User or industry defined data fields |
| Original reference number | User or industry defined data fields |
| Outlet identification | User or industry defined data fields |
| Card brand | User or industry defined data fields |
| Transaction date | User or industry defined date field—e.g. 010199 |
| Loading date | User or industry defined date field—e.g. 010199 |
| Other suitable data | User or industry defined data fields |

Retrieval system 410 can extract and process data fields that are used to correlate a retrieval data record of a payment record with a transaction record, and additional data fields that pertain to the retrieval. The following exemplary data fields may also be extracted and processed from the payment data record:

| | |
|---|---|
| Retrieval date | User or industry defined date field—e.g. 010199 |
| Case number | User or industry defined data fields |
| Card brand | User or industry defined data fields |
| Outlet ID | User or industry defined data fields |
| Retrieval reason | User or industry defined data fields |
| Transaction number | User or industry defined data fields |
| Transaction date | User or industry defined date field—e.g. 010199 |
| Merchant number | User or industry defined data fields |
| Amount | In predetermined currency, or with currency identifier—e.g. U.S. dollars |
| Other suitable data | User or industry defined data fields |

Chargeback system 412 can extract and process data fields that are used to correlate a chargeback record with a merchant transaction record, and additional data fields that pertain to the chargeback. The following exemplary data fields may also be extracted and processed from the payment data record:

| | |
|---|---|
| Case number | User or industry defined data fields |
| Iteration number | User or industry defined data fields |
| Sequence number | User or industry defined data fields |
| Transaction date | User or industry defined date field—e.g. 010199 |
| Chargeback date | User or industry defined date field—e.g. 010199 |
| Chargeback reason | User or industry defined data fields |
| Cardholder number | User or industry defined data fields |
| Transaction code | User or industry defined data fields |
| Other suitable data | User or industry defined data fields |

Configurable payment system 414 allows a user to include additional data fields from payment system that may be required for analyzing nonconforming data. For example, one or more payment systems may include additional data that can be used to analyze nonconforming data, such as customer signature data, internal fraud review data, or other suitable data.

In operation, system 400 is used to provide processing of payment records so as to allow payment records to be matched with transaction records to facilitate analysis and troubleshooting of payment transactions. System 400 allows a user to process payment data in a manner that preserves additional data added by payment systems, thus allowing a user to correlate this additional data with data received from the merchant systems so as to identify potential causes for nonconforming data.

FIG. 5 is a flow chart of a method 500 for processing transaction data and payment data in accordance with an exemplary embodiment of the present invention. Method 500 can be used to analyze transaction and payment data so as to identify sources of processing errors, fraud, mistaken data entry or other problems.

Method 500 begins at 502 where transaction data is received. For example, transaction data can be received from a merchant point of sale terminal via the public switched telephone network, the Internet, or other suitable communications media. The transaction data can also include data fields in addition to those that are standardized. The method then proceeds to 504.

At 504, transaction data is processed. The transaction data can include predetermined data fields that are required to be transmitted to an issuing bank, a bank card organization, or other payment systems in order to receive payment authorization for the transaction. The transaction data can also include additional data that is not transmitted to the payment system, and this data is excluded during processing from the data record that is transmitted to the payment system. The method then proceeds to 506.

At 506, payment data is received. The payment data can include a plurality of payment data records, where each payment data record contains data fields related to a transaction plus additional data fields related to the processing of payment data for that transaction. The method then proceeds to 508 where the payment data is processed. For example, the payment data records may include data fields that indicate that the merchant is required to retrieve the transaction record (a retrieval request), that payment for a transaction has been denied (a chargeback), that additional information is need to correct the transaction data (a deposit correction notice), or other status items that require the merchant to take additional action. The method then proceeds to 510.

At 510, it is determined whether a report request has been received. A report request is used to select data fields from the transaction data record and payment data record for a transaction to enable a user to determine the current status of any or all transactions, whether any errors exist in the transaction record, whether any additional actions are required to facilitate the processing of the transaction, or for other purposes. If a report request has not been received then the method proceeds to 524 and terminates. Otherwise the method proceeds to 512.

At 512, report parameters are received. For example, report parameters may be selected by a user from a list of data fields. Likewise, the report parameters may be selected from a list of pre-identified reports that contain data fields that have been determined to be useful for resolving certain discrepancies in transaction and payment data. After the report parameters are received at 512, the method proceeds to 514.

At 514, transaction data is correlated with payment data. For example, individual transaction records may be extracted pursuant to report parameters, and the payment data may be searched for corresponding data records. Likewise, all transaction data records may be matched with all payment data records within certain field range restrictions, such as for a particular merchant, payment system, transaction type, transaction date, terminal identifier, or other suitable field range restrictions. The method then proceeds to 516.

At 516, it is determined whether a correlation has been found between each transaction data record and each payment data record. If a correlation has been found the method proceeds to 518 where report data within the report parameters is generated. Otherwise, the method proceeds to 516 where error data is generated notifying a user that a corresponding payment data record has not been identified for a merchant data record, or that a merchant data record has not been identified for a payment data record. The method then proceeds to 522. At 522, it is determined whether additional data records exist that must be analyzed. If no such data records exist, the method proceeds to 524 and terminates. Otherwise, the method returns to 514.

In operation, method 500 is used to process transaction and payment data so as to facilitate the analysis of the data to identify causes for non-optimal transaction and payment processing. Such non-optimal transaction payment processing may be due to fraud, mistakes in data entry, malfunctioning of equipment, improper procedures, or other causes, and may result in significant losses to merchants or payment systems. Method 500 allows such problems to be readily identified, so as to prevent merchants from incurring losses that would have previously been too expensive or time-consuming to identify and correct.

FIG. 6 is a flowchart of a method 600 for generating report data in accordance with an exemplary embodiment of the present invention. Method 600 allows a user to select predetermined data fields from transaction data records and can be used to generate report data according to user-selected criteria.

Method 600 begins at step 602 where transaction data and payment data are received. For example, the transaction data and payment data may be received after a transaction data record has been matched to a payment data record. Likewise, a batch of transaction data records may first be matched to corresponding payment data records and may then be transferred for further processing. The method then proceeds to 604.

At 604, it is determined whether transaction detail data is required, such as if a user has selected transaction detail data for reporting. For example, the user may select one or more data fields from a transaction detail data template for inclusion in a report. Alternatively, a predetermined report format may be selected that includes predetermined data fields, such as data fields in the transaction detail data. If it is determined at 604 that transaction detail data is required, the method proceeds to 606 where transaction detail data fields are obtained. The method then proceeds to 608. Otherwise, if it is determined that transaction detail data is not required at 604, the method proceeds directly to 608.

At 608, it is determined whether fuel transaction detail data is required. For example, the user may select one or more data fields from a fuel transaction detail data template for inclusion in a report. Alternatively, a predetermined report format may be selected that includes predetermined data fields, such as data fields in the fuel transaction detail data. If it is determined at 608 that fuel transaction detail data is not required, the method proceeds directly to 612. Otherwise, the method proceeds to 610 where the fuel transaction detail data fields are obtained. The method then proceeds to 612.

At 612, it is determined whether restaurant transaction detail data is required. For example, the user may select one or more data fields from a restaurant transaction detail data template for inclusion in a report. Alternatively, a predetermined report format may be selected that includes predetermined data fields, such as data fields in the restaurant transaction detail data. If such data is not required, the method proceeds to 616, otherwise the method proceeds to 614 where restaurant transaction detail data fields are obtained according to the report parameters. The method then proceeds to 616.

At 616, it is determined whether configurable transaction detail data is required in systems that include user-configurable transaction detail data fields. For example, the user may select one or more data fields from a configurable transaction detail data template for inclusion in a report. Alternatively, a predetermined report format may be selected that includes predetermined data fields, such as data fields in the configurable transaction detail data. If it is determined at 616 that configurable transaction detail data is required the method proceeds to 618 where the configurable transaction detail data fields are extracted. Otherwise, the method proceeds to 620.

At 620, a report record is generated. For example, the report record can include one or more data fields from a transaction data record, such as those selected at steps 604 through 618, and one or more data fields from a payment data record received from a payment system. The report record can allow a user to readily determine the status of the transaction, the source of problems or discrepancies in the transaction data record and payment data record, whether the transaction is legitimate or fraudulent, or to perform other useful functions. Method 600 thus allows a single report record to be generated that contains data that would previously have required reference to multiple hardcopy printouts, separate software systems, or other expensive and time-consuming sources of data.

FIG. 7 is a flowchart of a method 700 for processing payment data in according with an exemplary embodiment of the present invention. Method 700 allows a user to select predetermined data fields from payment data records and can be used to generate report data according to user-selected criteria.

Method 700 begins at 702 where transaction data and payment data are received. The method then proceeds to 704 where it is determined whether payment transaction detail data is required. For example, the user may select one or more data fields from a payment transaction detail data template for inclusion in a report. Alternatively, a predetermined report format may be selected that includes predetermined data fields, such as data fields in the payment transaction detail data. If such data is not required, the method proceeds to 708. Otherwise, the method proceeds 706 where payment transaction detail data fields are retrieved. The method then proceeds to 708.

At 708, it is determined whether disposition detail data is required. For example, the user may select one or more data fields from a disposition detail data template for inclusion in a report. Alternatively, a predetermined report format may be selected that includes predetermined data fields, such as data fields in the disposition detail data. If it is determined at 708 that disposition detail data is required, the method proceeds to 710 where the disposition data fields are extracted, after which the proceeds to 712. Otherwise, the method proceeds directly to 712.

At 712, it is determined whether deposit correction detail data is required. For example, the user may select one or more data fields from a deposit correction detail data template for inclusion in a report. Alternatively, a predetermined report format may be selected that includes predetermined data fields, such as data fields in the deposit correction detail data. If it is determined at 712 that deposit correction detail data is required, the method proceeds to 714 where the deposit correction detail data fields are extracted, after which the method proceeds to 716. Otherwise, the method proceeds directly to 716.

At 716, it is determined whether reversal detail data is required. For example, the user may select one or more data fields from a reversal detail data template for inclusion in a report. Alternatively, a predetermined report format may be selected that includes predetermined data fields, such as data fields in the reversal detail data. If it is determined at 716 that reversal detail data is required, the method proceeds to 718 where the reversal detail data fields are extracted, after which the method proceeds to 720. Otherwise, the method proceeds directly to 712.

At 720, it is determined whether retrieval detail data is required. For example, the user may select one or more data fields from a retrieval detail data template for inclusion in a report. Alternatively, a predetermined report format may be selected that includes predetermined data fields, such as data fields in the retrieval detail data. If it is determined at 720 that retrieval detail data is required, the method proceeds to 722 where the retrieval detail data fields are extracted, after which the method proceeds to 724. Otherwise, the method proceeds directly to 724.

At 724, it is determined whether chargeback detail data is required. For example, the user may select one or more data fields from a chargeback detail data template for inclusion in a report. Alternatively, a predetermined report format may be selected that includes predetermined data fields, such as data fields in the chargeback detail data. If it is determined at 724 that chargeback detail data is required, the method proceeds to 726 where the chargeback detail data fields are extracted, after which the method proceeds to 728. Otherwise, the method proceeds directly to 728.

At 728, it is determined whether configurable payment detail data is required. For example, the user may select one or more data fields from a configurable payment detail data template for inclusion in a report. Alternatively, a predetermined report format may be selected that includes predetermined data fields, such as data fields in the configurable payment detail data. If it is determined at 728 that configurable payment detail data is required, the method proceeds to 730 where the configurable payment detail data fields are extracted, after which the method proceeds to 732. Otherwise, the method proceeds directly to 732.

At 732, a report record is generated. For example, the report record can include one or more data fields from a payment data record, such as those selected at steps 704 through 730, and one or more data fields from a transaction data record received from a merchant system. The report record can allow a user to readily determine the status of the transaction, the source of problems or discrepancies in the transaction data record and payment data record, whether the transaction is legitimate or fraudulent, or to perform other useful functions. Method 700 thus allows a single report record to be generated that contains data that would previously have required reference to multiple hardcopy printouts, separate software systems, or other expensive and time-consuming sources of data.

Although preferred and exemplary embodiments of a system and method for processing payment data have been described in detail herein, those skilled in the art will also recognize that various substitutions and modifications can be made to the systems and methods without departing from the scope and spirit of the appended claims.

What is claimed is:

1. A system for processing electronic payment transaction data comprising:
   a front-end system configured to electronically receive transaction data from electronic data processing equipment at one or more merchants during an electronic transaction authorization process, the transaction data comprising a terminal identifier data field;
   a back-end system configured to electronically receive disputed payment data from a payment system; and
   a reporting system for correlating the terminal identifier data field with the disputed payment data and generating a report that identifies the terminal identifier data fields associated with the disputed payment data.

2. The system of claim 1 wherein the reporting system further comprises a data display system to display at least one data field from a transaction data table entry with at least one data field from a payment data table entry.

3. The system of claim 1 wherein the front-end system further comprises a transaction detail system to receive one or more of the group comprising rental pickup date, rental return data, rental agreement data, and rental agreement value.

4. The system of claim 1 wherein the front-end system further comprises a fuel transaction system to receive one or more of the group comprising vehicle identification data, odometer data, and driver data.

5. The system of claim 1 wherein the front-end system further comprises a restaurant transaction system to receive one or more of the group comprising tip data, employee number, food transaction identifier, and beverage transaction identifier.

6. The system of claim 1 wherein the back-end system further comprises a deposit correction system to receive one or more of the group comprising processing date, batch identification, outlet identification, deposit correction notice, exception code number, merchant outlet number, transaction identification number, loaded date, control identification number.

7. The system of claim 1 wherein the back-end system further comprises a reversal system to receive one or more of the group comprising case number, iteration number, sequence number, reversal date, chargeback amount field, chargeback date field, chargeback reason identification, acquirer reference number, original reference number, outlet identification, card brand, transaction date, and loading date.

8. A method for presenting transaction data comprising:
   receiving transaction data generated by electronic data processing equipment at one or more merchants during an authorization process, the transaction data comprising a terminal identifier data field;
   receiving payment data generated by two or more electronic payment data processing systems during a settlement process, the payment data comprising disputed payment data; and
   electronically correlating by a computer the terminal identifier data field with the disputed payment data to electronically generate a report that identifies the terminal identifiers associated with the disputed payment data.

9. The method of claim 8 further comprising displaying at least one data field from a transaction data table entry with at least one data field from a payment data table entry.

10. The method of claim 9 wherein displaying at least one data field from the transaction data table entry comprises displaying at least one transaction detail data field.

11. The method of claim 9 wherein displaying at least one data field from the transaction data table entry comprises displaying at least one fuel transaction data field.

12. The method of claim 9 wherein displaying at least one data field from the payment data table entry comprises displaying at least one payment transactions data field.

13. The method of claim 9 wherein displaying at least one data field from the payment data table entry comprises displaying at least one disposition data field.

14. The method of claim 9 wherein displaying at least one data field from the payment data table entry comprises displaying at least one deposit correction data field.

15. The method of claim 9 wherein displaying at least one data field from the payment data table entry comprises displaying at least one reversal data field.

* * * * *